United States Patent
Ancimer

(10) Patent No.: US 7,133,761 B2
(45) Date of Patent: Nov. 7, 2006

(54) METHOD AND APPARATUS FOR CONTROLLING AN INTERNAL COMBUSTION ENGINE USING ACCELEROMETERS

(75) Inventor: Richard Ancimer, Vancouver (CA)

(73) Assignee: Westport Research Inc., Vancouver (CA)

( * ) Notice: Subject to any disclaimer, the term of this patent is extended or adjusted under 35 U.S.C. 154(b) by 170 days.

(21) Appl. No.: 10/822,333

(22) Filed: Apr. 12, 2004

(65) Prior Publication Data

US 2004/0267430 A1 Dec. 30, 2004

Related U.S. Application Data

(60) Provisional application No. 60/483,855, filed on Jun. 30, 2003.

(51) Int. Cl.
B60T 7/12 (2006.01)
(52) U.S. Cl. .......... 701/103; 701/110; 701/105; 123/435; 123/501; 123/502; 73/116
(58) Field of Classification Search ........ 701/103–105, 701/101, 113, 114, 110; 123/406.26, 406.27, 123/406.28, 406.44, 298, 435, 501, 502; 73/116, 117.1, 117.2, 117.3, 118.1, 118
See application file for complete search history.

(56) References Cited

U.S. PATENT DOCUMENTS 5,050,556 A * 9/1991 Williams et al. ....... 123/406.28
5,840,218 A * 11/1998 Tani et al. ............... 123/435
6,161,523 A 12/2000 Unland et al.
6,408,819 B1 6/2002 Mezger et al.
6,598,468 B1 7/2003 Zur Loye et al.
6,688,286 B1 2/2004 Kokubo et al.

FOREIGN PATENT DOCUMENTS

DE 40 02 228 8/1991
DE 43 41 796 6/1995

OTHER PUBLICATIONS

Kim et al., "Cepstral Analysis as a Tool for Robust Procesing, Deverberation and Detection of Transients", *Mechanical Systems and Signal Processing*, vol. 6, No. 1, pp. 1-15, 1992.

* cited by examiner

Primary Examiner—Henry C. Yuen
Assistant Examiner—Johhny H. Hoang
(74) Attorney, Agent, or Firm—McAndrews, Held & Malloy, Ltd.

(57) ABSTRACT

A method for processing an accelerometer data set generated from an operating internal combustion engine is disclosed. The processed accelerometer data is cepstrally filtered and a heat release trace is pulled from the accelerometer data set. That heat release trace is then used to estimate combustion quality and combustion phasing within the engine and control future combustion events using this information. Misfire and knock sensing is also incorporated into the engine controls. The method provides for an engine to allow it to adjust combustion from cycle window to cycle window generally without the need for expensive and less durable direct pressure measurement devices as compared to accelerometers. The resulting fuel injection speed results in the fuel passing through shock waves within the combustion chamber, which, in turn, promotes combustion of the fuel by promoting mixing of the fuel and intake charge within the combustion chamber.

26 Claims, 5 Drawing Sheets

METHOD AND APPARATUS FOR CONTROLLING AN INTERNAL COMBUSTION ENGINE USING ACCELEROMETERS

RELATED APPLICATIONS

This application claims priority of Provisional Application Ser. No. 60/483,855, entitled "Method and Apparatus for Controlling an Internal Combustion Engine Using Accelerometer," filed Jun. 30, 2003, which is hereby incorporated by reference in its entirety.

BACKGROUND OF THE INVENTION

Internal combustion engines benefit from real time estimation of combustion quality and start of combustion (SOC). Knowing when combustion commences can help provide a control strategy that adjusts the SOC in future engine cycles to allow for improved performance of the engine. One engine that benefits substantially from SOC monitoring or estimation, is an engine that relies on the auto-ignition of a pre-mixed fuel and air charge. The auto-ignition of a pre-mixed fuel and air charge is referred to here as pre-mixed charge compression ignition, or PCCI. There tends to be emissions and efficiency benefits with PCCI combustion modes over typical diffusion or flame propagation combustion modes. An additional combustion strategy that benefits from SOC estimation is an engine that supplements the energy provided by a PCCI combustion event with a directly injected quantity of fuel generally provided once SOC has commenced. This type of engine is known as a premixed charge direct injection (PCDI) engine.

In general, various fuels or mixtures of fuels can be used to drive a PCCI or PCDI engine. By way of example, gaseous-fuelled high compression ratio engines can operate effectively where a small amount of pilot fuel is introduced into a pre-mixed charge containing gaseous fuel early in the compression stroke of an engine. The pilot fuel changes the auto-ignition properties of the premixed gaseous fuel. The injection timing and quantity of the pilot fuel can be manipulated such that the charge auto-ignites when the piston is at or near top dead center. However, the pilot fuel timing and quantity needed to auto-ignite the charge at the desired time of the engine cycle depends on many variables that can change over time and between cylinders. For example, one cylinder may run hotter than others (due to less cooling through the cylinder walls, or more trapped residual gases), thereby needing a smaller pilot fuel quantity to auto-ignite the charge at the desired time as compared to the other cylinders. Similarly, variations in fuel quality or intake manifold temperature over time forces the pilot fuel quantity and timing to be adjusted to maintain a fixed SOC. Preferably, an accurate estimate of the SOC in each cylinder is used in a feedback control loop, where a control lever such as pilot fuel timing or quantity is used to adjust the SOC to a target value. In this way, the PCCI/PCDI application is run in an efficient and robust manner.

Currently, SOC control is generally provided by algorithms that rely on a direct measurement of a signal indicative of pressure within the combustion chamber. For example, U.S. Pat. No. 6,598,468 and German Patent 4341796.5 use techniques to correlate a measured parameter indicative of pressure to SOC. The estimated SOC value is then used to adjust levers available to the controller to influence the SOC in future engine cycles. That is, a feedback control loop is used to minimize the error between the measured SOC and a target SOC. An operator specifies the target SOC. A sensor that measures the deflection of a diaphragm in contact with the in-cylinder pressure using optical methods is an example of such a pressure sensor. An optical sensor of this type could provide sufficiently accurate pressure measurements from the combustion chamber for the techniques taught in the art. Optical sensors, or other direct pressure measurement instruments, can be expensive and may lack the reliability and robustness (due to the harsh environment within a combustion chamber) required for the application.

An alternate sensor that can be used to estimate pressure in the combustion chamber is an accelerometer. The techniques taught above are used to estimate an SOC from the measured accelerometer data: see U.S. Pat. No. 6,408,819 and Lyon, "Cepstral analysis as a tool for robust processing, deverberation, and detection of transients", *Mechanical Systems and Signal Processing*, (Academic Press: 1992), 6(1), p 1–15. Such techniques are valuable, as accelerometers tend to be less expensive, and currently more reliable and more robust than direct pressure measuring sensors. However, the drawback with U.S. Pat. No. 6,408,819 is that this technique relies on a method of reconstructing a pressure signal that is unlikely to be sufficiently accurate. Cepstral filtering taught by Lyon can also be used to provide a pressure signal for use with U.S. Pat. No. 6,408,819. However, the cepstral filtering taught by Lyon reconstructs the combustion pressure. It may be possible to develop a method to extract parameters from the combustion pressure that would correlate with SOC. However, one of these parameters is magnitude. Where cepstral analysis is used, the magnitude varies in a non-linear fashion with load. A standard reconstruction technique results in a linear variation in magnitude with respect to load; see DE 43 41 796.5. The non-linearity introduced by cepstral filtering creates complexities when correlating parameters to SOC. The result can be higher errors in the estimated SOC for a given cycle of the engine. The combustion control technique taught in U.S. Pat. No. 6,598,468 relies on a measure of the in-cylinder pressure prior to the on-set of combustion, and a second measure after the combustion has begun. Relying on a standard pressure reconstruction technique would result in a relatively inaccurate picture of the in-cylinder pressure prior to combustion. Cepstral filtering improves the reliability of the measured pressure, but in doing so provides a measure of the combustion pressure. That is, the use of an accelerometer may not give an accurate measure of the in-cylinder pressure prior to combustion, and hence can lead to problems in applying the technique proposed in U.S. Pat. No. 6,598,468.

The applicant has addressed these problems by developing a method and apparatus using accelerometer data that delivers an SOC estimate that is comparable to estimates provided by directly measured pressure indicative signals.

BRIEF SUMMARY OF THE INVENTION

The present invention overcomes the shortcomings noted above by utilizing a method to estimate SOC over a range of cycles that relies on a reconstruction of a heat release trace where the influence of the non-linearity noted above are reduced. The variations in the magnitude of this reconstructed signal over a wide range of engine loads is relatively linear as compared to the variations in the magnitude of the pressure signal.

Once estimated, this SOC information can be used to vary one of a number of levers available to the controller to adjust timing of SOC to help more closely match target timing for SOC.

A method is disclosed where combustion of a fuel within a combustion chamber of internal combustion engine is provided. The method comprises, during a cycle of the engine, introducing a charge into the combustion chamber, compressing the charge within the combustion chamber, introducing the fuel into the combustion chamber, burning the fuel within the combustion chamber to drive a piston disposed within the combustion chamber. An accelerometer data set is delivered to a controller, the accelerometer data set collected during at least two cycles of the engine. The accelerometer data set is processed to generate a processed data set indicative of a heat release rate over the at least two cycles and the processed data set is used to estimate an SOC error using a pre-determined target start of combustion for the fuel. If the magnitude of the SOC error is greater than 0, a start of combustion lever for at least one subsequent cycle of the engine is adjusted to drive to a corrected start of combustion towards the pre-determined target start of combustion.

The method further discloses a lever that includes at least one of glow plug temperature, spark plug timing, pilot fuel quantity, pilot fuel injection timing, intake manifold temperature, intake manifold pressure, exhaust gas intake charge concentration, pilot fuel injection duration, and equivalence ratio of the fuel.

A further embodiment includes where the SOC error is determined from a comparison of an estimated start of combustion of the fuel determined from the processed data set and the pre-determined target start of combustion.

A further embodiment includes where the controller adjusts the start of combustion lever and where a second controller adjusts the start of combustion lever.

A further embodiment includes an accelerometer data set collected from at least 10 consecutive cycles of the engine and collected from between 5 and 15 consecutive cycles of the engine.

A further embodiment includes where the pre-determined start of combustion is based on at least one of engine speed and boost pressure and where a cepstral filter is applied to the accelerometer data set to provide the processed data set.

The method disclosed provides an estimated start of combustion determined using a peak value of the processed data, a crank angle associated with the peak value of the processed data and a boost pressure associated with the charge over the at least two cycles.

A further embodiment includes the estimated start of combustion determined using a slope value of the processed data determined from an associated crank angle for the slope value earlier than a peak crank angle. Also disclosed is the accelerometer data set used to select a knock measurement, the knock measurement used to control rate of combustion in the subsequent cycle of the engine.

A further embodiment includes selecting from the accelerometer data set a misfire measurement, the misfire measurement used to control combustion in the subsequent cycle of the engine.

A further embodiment includes determining combustion quality within a combustion chamber of an operating internal combustion engine where during a cycles of the engine, an accelerometer data set is generated from accelerometer measurements provided by an accelerometer positioned on the engine and capable of measuring data indicative of combustion behavior within the combustion chamber, the accelerometer data set is processed to reconstruct a processed data set indicative of heat release rate within the combustion chamber during the cycle of the engine and the properties of the processed data set are compared with properties of a predetermined desired data set to provide an indication of the combustion quality.

A further embodiment includes calculating a transfer function appropriate for reconstructing the processed data set from the accelerometer data set and applying a cepstral filter to the accelerometer data set data set to generate the processed data set.

A further embodiment includes comparing a peak value from the processed data to a peak value from the predetermined desired data set to provide the indication of the combustion quality as discussed.

A further embodiment includes a method of estimating start of combustion within a combustion chamber of an internal combustion engine, where during a cycle of the engine, a charge is introduced into the combustion chamber, the charge within the combustion chamber is compressed and a fuel is introduced into the combustion chamber, burned thus driving a piston disposed within the combustion chamber, and a data set is provided indicative of a physical condition within the combustion chamber during the cycle. At least two data sets from corresponding cycles of the engine are gathered and processed to generate processed data sets indicative of a heat release rate over the corresponding cycles of the engine. A cepstral filter is applied to the at least two data sets to generate the processed data sets. The start of combustion is estimated for the corresponding cycles of the engine from a predetermined relationship that is a function of selected properties of the processed data sets.

A further embodiment of the method of estimating start of combustion uses between 5 and 15 data sets to generate the processed data sets or where fewer than 20 data sets are used to generate the processed data sets.

A further embodiment of the method of estimating start of combustion uses at least two data sets from consecutive cycles of the engine and where the data set are collected from at least one of an accelerometer, an optical sensor, a strain gauge and a pressure sensor.

A further embodiment of the method of estimating start of combustion includes an averaging filter applied to the at least two data sets prior to applying the cepstral filter. Also the method disclosed includes selected properties that comprise at least one of a peak value, a peak value crank angle, a crank angle curve width at a pre-determined fraction of the peak value, a slope of the processed data at a rising crank angle found prior to the peak value, and a ratio of the peak value and the width.

A further embodiment of the method of estimating start of combustion includes where the predetermined relationship is:

$$SOC = a_1 + (a_2 + a_3 x(\theta_p)) \times x(\theta_p) + (a_4 + a_5 \theta_p) \times \theta_p + (a_6 + (a_7 + a_8 x(\theta_p)) \times x(\theta_p) + (a_9 + a_{10} \theta_p) \times \theta_p) \times P$$

where $a_1, \ldots, a_{10}$ are constants from the processed data set, $x(\theta_p)$ is the peak value, $\theta_p$ is the peak value crank angle, and P is a boost pressure associated with the charge over the corresponding cycles.

DETAILED DESCRIPTION OF THE INVENTION

A method is provided for controlling the start of combustion (SOC) of a fuel within a combustion chamber of an internal combustion engine.

Figure 1:
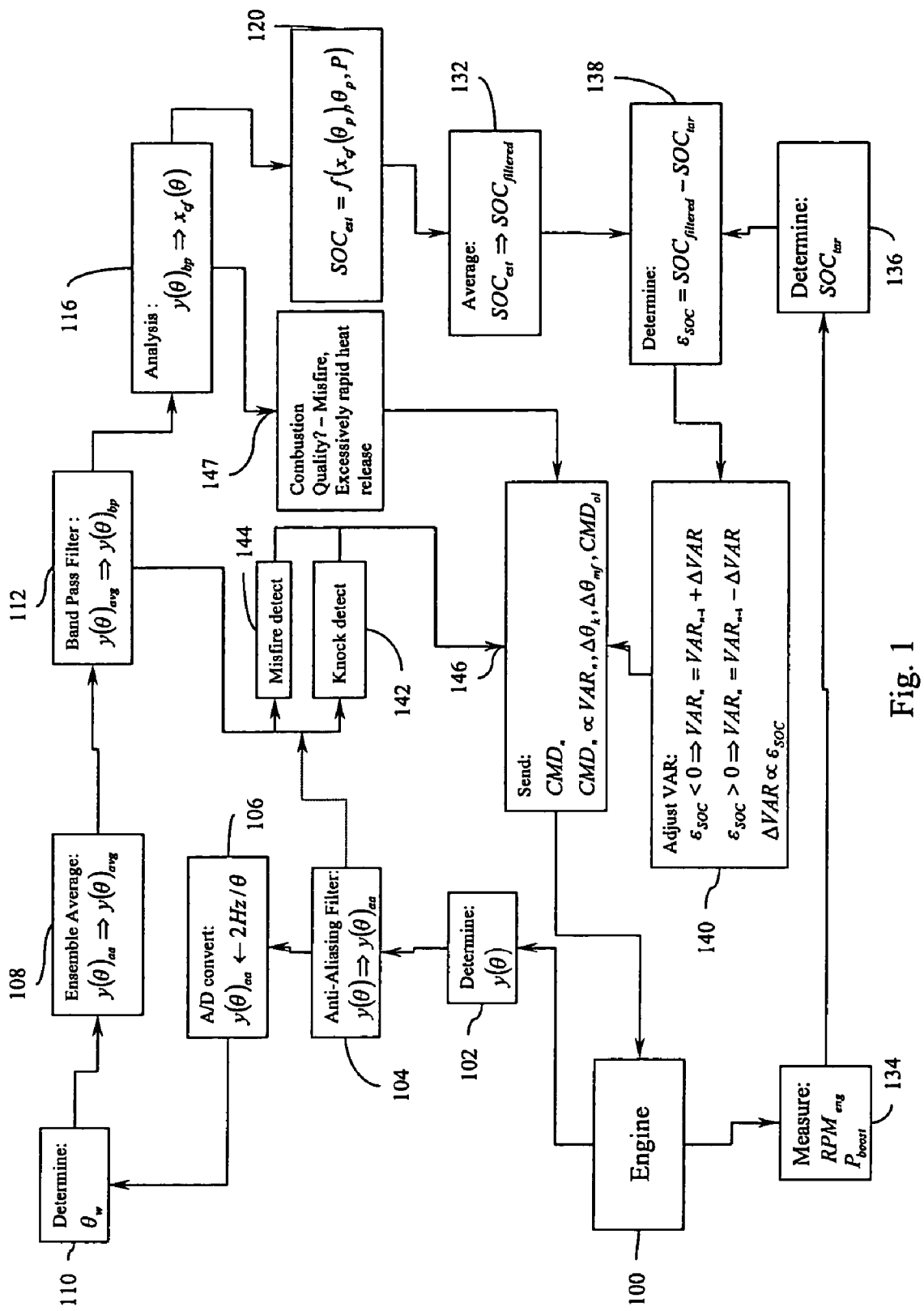
FIG. 1 shows a flow chart to demonstrate how accelerometer data is initially filtered and used to generate an estimate of heat release within the combustion chamber of an internal combustion engine.

Referring to FIG. 1, a flow diagram is provided setting out the subject method used to control the start of combustion in an internal combustion engine. Reference is made to engine 100 where accelerometer signals 102 ($y(\theta)$) are first determined by an accelerometer across a window of selected crank angle degrees ($\theta$) for a cycle of an engine. These values can be filtered with an anti-aliasing filter 104, converted to a digital data set 106, and windowed. The crank angle window ($\theta_w$) can be predetermined and in light of the engine properties and operating conditions, step 110. The windowed data can be averaged across the same selected window of crank angle degrees for several engine cycles with an ensemble-averaging filter 108. A band pass filter 112 can be applied to the averaged and windowed digital knock signal ($y(\theta)_{avg}$) resulting in band pass signal ($y(\theta)_{bp}$)). Note that the window and band-pass filter may be applied prior to digitization of the signal.

The filtered signal $y(\theta)_{bp}$ is used to develop a reconstructed heat release rate ($x_{cf}(\theta)$) 116 from which an estimate of SOC ($SOC_{est}$) is determined 120. Generation of $x_{cf}(\theta)$ from cepstral filtering and reconstruction of $y(\theta)_{bp}$ to provide $x_{cf}(\theta)$ is discussed in more detail below. Also, generation of a $SOC_{est}$ from the function, $f(x_{cf}(\theta_p), \theta_p, P)$, (where P is the boost pressure for the cycle or cycles considered) will be discussed further below.

Filtered $SOC_{est}$ ($SOC_{filtered}$) 132 can be determined over a number of SOC estimates (5 to 20 estimates by way of example). Depending on the application for the $SOC_{est}$, this is a step that can be by-passed if SOC requires adjustment within a short time frame—for example, over a transient, or when unusual combustion quality such as a misfire or highly excessive heat release is detected. In general, however, step 132 can be valuable to remove variability in SOC estimates where the time is available for additional processing.

Also, step 108 and step 132 can perform similar averaging functions, each with particular advantages and disadvantages. Opting for step 132 over 108 results in greater accuracy but less computational efficiency. Opting for step 108 over 132 results in greater computational efficiency but less accuracy. The application and hardware can help to determine whether to employ both, or either step 108 or 132.

An $\epsilon_{SOC}$ is found at step 138 based on the difference between the target start of combustion ($SOC_{tar}$) found, for example, from the engine boost pressure and speed as seen in steps 134 and 136 and $SOC_{filtered}$-$\epsilon_{SOC}$ is used at step 140 to determine a variation $VAR_n$ on the control variable used to control SOC for the engine used. That is, $\Delta VAR$ is calculated based on $\epsilon_{SOC}$ as $\Delta VAR \propto f(\epsilon_{SOC})$. At step 146, $\Delta VAR$ is used to control the command signal generated from the variation calculated at step 140. The variation is relative to the open loop value $CMD_{ol}$. The open loop value can be estimated, for example, based on the engine speed and boost level, or from a model based control algorithm.

Further, with the presence of the accelerometer, misfires and knock can also be detected directly and used to vary $CMD_n$ as each provides information as to whether an excessively fast burn rate or a misfire has occurred. Appropriate changes to $CMD_n$ are made. For example, if an excessively fast burn rate is detected, $SOC_{tar}$ is retarded. If misfire is detected, the pilot fuel quantity can be increased for the cylinder in question. Accordingly, $CMD_n$ is sent to engine 100.

Combustion quality determined from step 116 can also deliver, at step 147, an indication of misfire or excessively rapid heat release similar to the provided directly by the accelerometer at step 144. This too can be used to set or adjust $CMD_n$ as discussed above.

Figure 2:
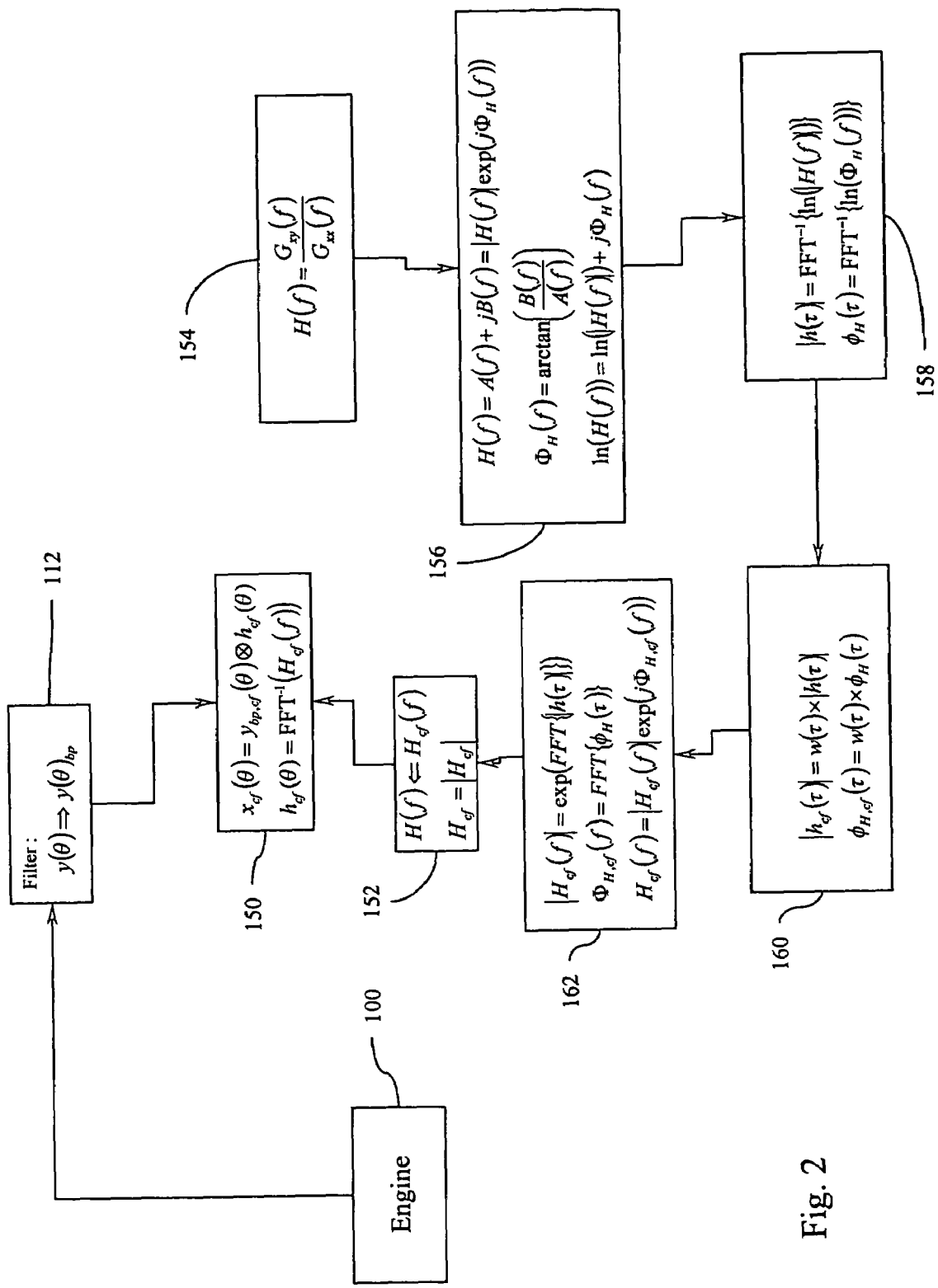
FIG. 2 shows a flow chart to demonstrate how a filtered accelerometer data set is filtered using cepstral analysis to generate a transfer function for deriving the heat release trace.

Referring to FIG. 2, cepstral analysis of step 116 from FIG. 1 is further considered. In standard reconstruction techniques the measured signal $Y(\theta)_{bp}$ is transformed into the desired source signal $x(\theta)$ using a transfer function $h(\theta)$. The source signal for the purposes of this application is a heat release trace, but can also be another signal indicative of combustion behavior, such as a pressure trace. Transfer function $h_{cf}(\theta)$ can be represented in both time and frequency domain. Specifically, it can be shown as:

$$x(\theta) = h(\theta) \otimes y(\theta) \quad \quad 1$$

$$H(f) = \frac{X(f)}{Y(f)} \quad \quad 2$$

The cepstral reconstruction technique applies a similar principle, with an additional filtering step, described below:

$$x_{cf}(\theta) = h_{cf}(\theta) \otimes y_{bp,cf}(\theta) \quad \quad 3a$$

$$h_{cf}(\theta) = FFT^{-1}(H_{cf}(f)) \quad \quad 3b$$

$$H_{cf}(f) = \text{Cepstral}[H(f)] \quad \quad 4$$

The purpose of the cepstral filtering is to reduce the sensitivity of the reconstruction process to the zeroes and poles of the transfer function.

The flow chart in FIG. 2 describes the method in which the cepstral filter transfer function $H_{cf}(f)$ is determined.

As equation 4 indicates, $H_{cf}(f)$ is determined from $H(f)$. $H(f)$ is determined from the auto- and cross-spectral estimates of the source $x(\theta)$ and measured signals $y(\theta)_{bp}$. Specifically, $$H(f) = \frac{G_{xx}(f)}{G_{xy}(f)} \quad \quad 5$$

$H(f)$ is then cepstrally filtered using the series of steps 156, 158, and 160. This provides for a transfer function that is determined in a computationally efficient way.

This process can be shown starting with step 156 where the natural logarithm of the transfer $H(f)$ function is determined at step 156:

$$H(f) = A(f) + jB(f) = |H(f)| \exp(j\Phi_H(f)) \quad \quad 6$$

$$\Phi_H(f) = \arctan\left(\frac{B(f)}{(A(f))}\right) \quad \text{6a}$$

where $$\ln(H(f)) = \ln(|H(f)|) + j\Phi_H(f) \quad 7$$

At step 158, the inverse fast Fourier transform is performed with reference to the magnitude and phase of the function:

$$|h(\tau)| = FFT^{-1}\{\ln(|H(f)|)\} \quad \text{8a}$$

$$\phi_H(\tau) = FFT^{-1}\{\ln(\Phi_H(f))\} \quad \text{8b}$$

A window function at step 160 is applied to the magnitude and phase of the transfer function:

$$|h_{cf}(\tau)| = w(\tau) \times |h(\tau)| \quad \text{9a}$$

$$\phi_{H,cf}(\tau) = w(\tau) \times \phi_H(\tau) \quad \text{9b}$$

The result here is the smoothed cepstral transfer function $H_{cf}(f)$, step 162:

$$|H_{cf}(f)| = \exp(FFT\{|h(\tau)|\}) \quad \text{10a}$$

$$\Phi_{H,cf}(f) = FFT(\phi_H(\tau)) \quad \text{10b}$$

$$H_{cf}(f) = |H_{cf}(f)| \exp(j\Phi_{H,cf}(f)) \quad \text{10c}$$

The smoothing process is a non-linear operation because the window is applied to the logarithm of the magnitude.

The cepstrally filtered transfer function is applied to the cepstrally filtered measured signal $y(\theta)_{bp,cf}$ resulting in the reconstructed signal $x_{cf}(\theta)$. The technique to cepstrally filter the measured signal $y(\theta)_{bp}$ is discussed below with reference to FIG. 3.

Figure 3:
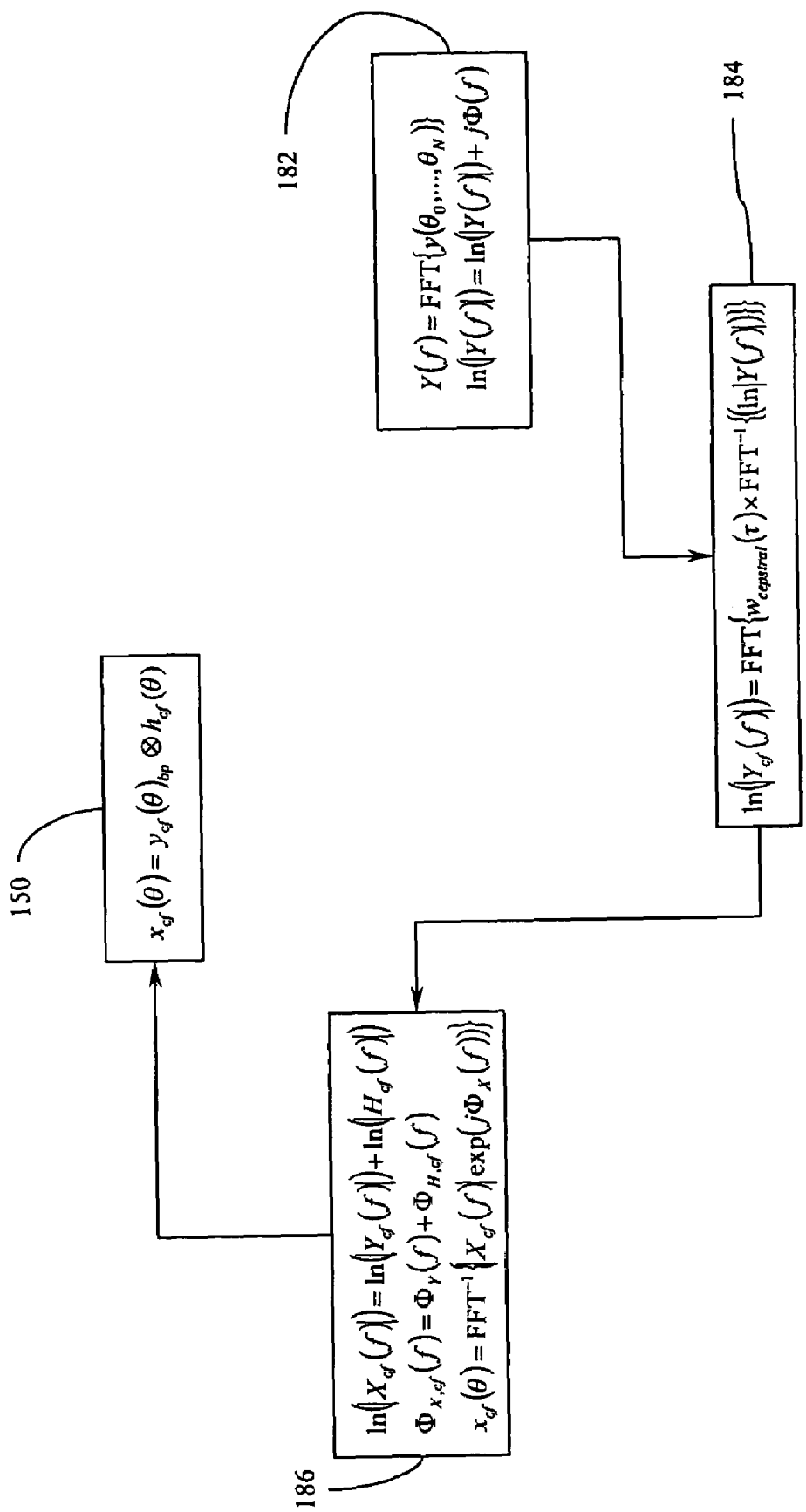
FIG. 3 shows a flow chart to demonstrate how the heat release trace is reconstructed from the accelerometer data and transfer function.

Upon completion of the filtering, and referring to FIG. 3, reconstruction of the sought signal $x_{cf}(\theta)$ from the accelerometer data $y(\theta)$ can be perform with the acquired filtered transfer function $H_{cf}(f)$.

Initially, step 182 provides $Y(f)$ once fast Fourier transform is performed on signal $y(\theta)$ where the logarithm of the function provides the magnitude and phase of the frequency domain signal:

$$Y(f) = FFT\{y(\theta_0, \ldots, \theta_N)\} \quad \text{10a}$$

$$\ln(|Y(f)|) = \ln(|Y(f)|) + j\Phi_y(f) \quad \text{10b}$$

Cepstral filtering is applied to the magnitude of the frequency domain signal, $|Y(f)|$, at step 184 where:

$$\ln(|Y_{cf}(f)|) = FFT\{w_{cepstral}(\tau) \times FFT^{-1}\{(\ln|Y(f)|)\}\} \quad 11$$

after which, at step 186, the reconstructed function $x_{cf}(\theta)$ is calculated by applying the transfer function to the magnitude and phase and then calculating the inverse fast Fourier transform:

$$\ln(|X_{cf}(f)|) = \ln(|Y_{cf}(f)|) + \ln|H_{cf}(f)| \quad \text{12a}$$

$$\Phi_X(f) = \Phi_Y(f) + \Phi_{H,cf}(f) \quad \text{12b}$$

$$x(\theta)_{cf} = FFT^{-1}\{|X(f)|\exp(j\Phi_X(f))\} \quad \text{12c}$$

The reconstructed signal can be distorted if $\Phi_X(f)$ is cepstrally filtered to provide $\Phi_{Y,cf}(f) \ldots$ It is imperative that accurate phase information be retained. Therefore, the phase of transfer function is smoothed, but the phase $\Phi_Y(f)$ is not smoothed, or is smoothed to a lesser degree.

It should be noted that the ability of the transfer function $H_{cf}(f)$ to reconstruct the heat release over the entire load and ultimately the SOC range considered depends on both the processing parameters chosen and the data set used to estimate the transfer function, H(f). The criteria used to select the transfer function H(f) and processing parameters is preferably based on the location of peak reconstructed heat release. The transfer function and processing parameters where an acceptable correlation between the SOC and the peak heat release are found are determined empirically from the measured data. Note that it may be necessary to use a different transfer function for each cylinder. Also, it may be necessary, although not preferred, to use multiple transfer functions to ensure accurate reconstruction over the entire speed-load range of the engine.

Figure 4:
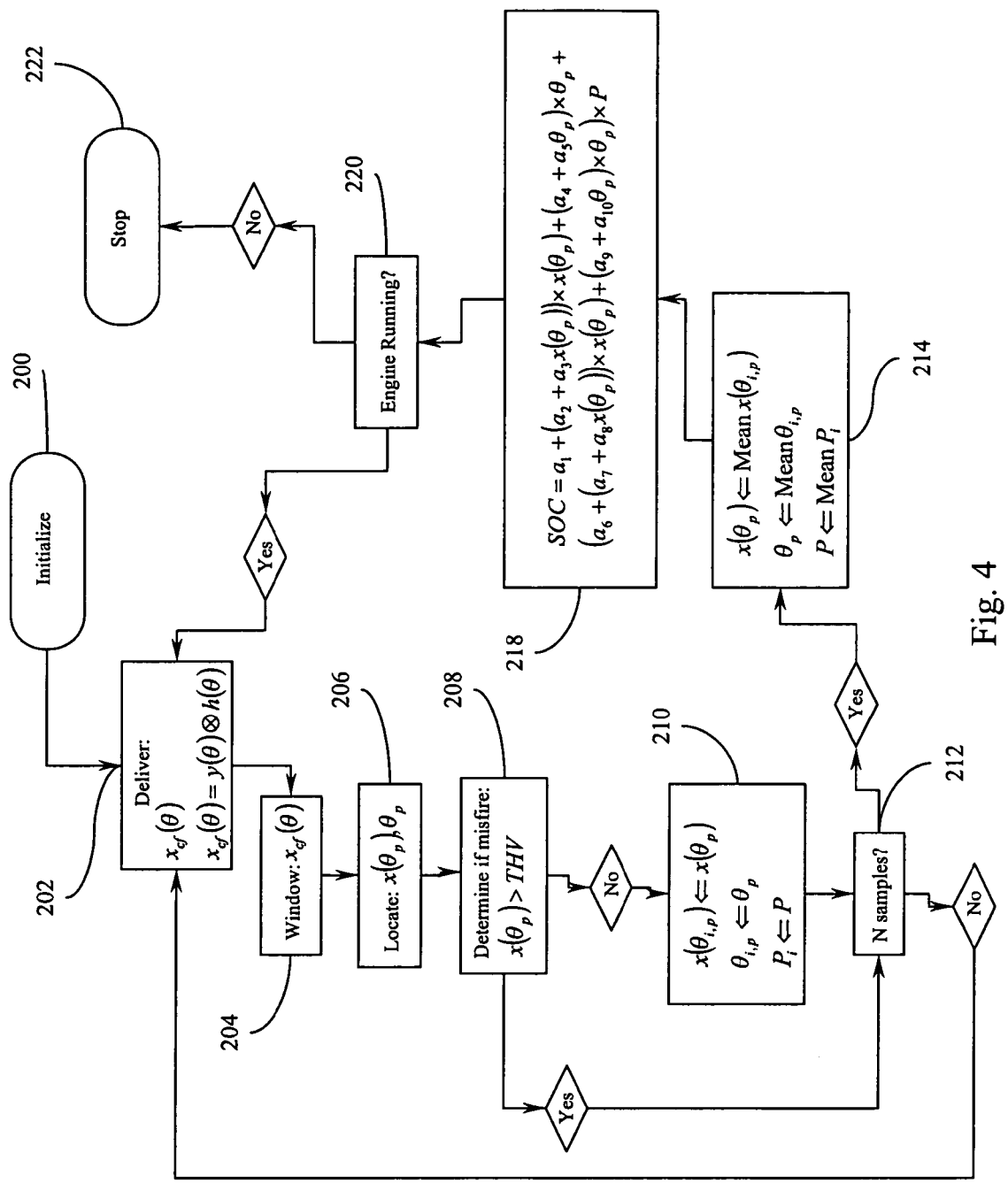
FIG. 4 shows a flow chart to demonstrate how SOC is estimated from the reconstructed heat release trace.

Referring to FIG. 4, a preferred method for step 120 of FIG. 1 is provided. Here, $x_{cf}(\theta)$ determined from the transfer function and reconstruction processing parameters, is used to estimate start of combustion based on a pre-determined relationship between SOC and the resulting reconstructed signal, $x_{cf}(\theta)$. At step 200 of FIG. 4, the system is initialized and, as discussed above, sought heat release trace signal is delivered from accelerometer signal, $y(\theta)$, summarized at step 202. The chosen window for analysis of SOC from $x_{cf}(\theta)$ is chosen at step 204 and from this window the signal peak magnitude $x(\theta_p)$ and position $\theta_p$ in the engine cycle are located at step 206. Here the "cf" subscript is dropped for brevity however, this signal is still the processed cepstrally filtered signal discussed above. Depending on the location $\theta_p$ and magnitude of $x(\theta_p)$, a misfire of the engine can be determined. For example, when $x(\theta_p) < THV$, where THV is a calibrated threshold value for the particular cylinder or engine, a misfire can be assumed to have occurred. This step 208 is also provided at step 147 from FIG. 1. A consideration here of excessively rapid heat release may also be incorporated as set out in step 147. If a misfire occurs, appropriate control actions may be taken outside the SOC calculation loop. Within the SOC calculation loop, if a misfire is detected, the algorithm jumps to step 212 to determine if the sought number of samples from the engine have been acquired. If there were a misfire this step would not be passed, as no additional value would have been accumulated for the sought sample size. If there is no misfire, then the algorithm moves onto step 210 where the sample $x(\theta_p)$, at crank angle $\theta_p$ and P are set for the valid sample cycle, i, referenced as $x_i(\theta_p)$, $\theta_{i,p}$ and $P_i$. P is the manifold pressure.

Once the sought sample size is determined, where the sample size is a predetermined value, a mean value for each of sets $x(\theta_{i,p})$, crank angle $\theta_{i,p}$ and $P_i$ of the range of samples, i, is determined at step 214. The heat release mean parameter values so calculated are then used to estimate SOC in step 218. Based on these values, determined at step 214, the following function has been found to be a preferred method wherein a k polynomials function, where k is 10, is used determine SOC:

$$SOC = a_1 + (a_2 + a_3 x(\theta_p)) \times x(\theta_p) + (a_4 + a_5 \theta_p) \times \theta_p + (a_6 + (a_7 + a_8 x(\theta_p)) \times x(\theta_p) + (a_9 + a_{10}\theta_p) \times \theta_p) \times P \quad 13$$

where $a_k$ makes up the constants determined for the polynomial for the engine calibrated for this control method. Note that an alternate correlation equation can be used. For example, simple linear correlations can be developed for different boost levels. Correlation A might hold at low boost conditions and correlation B at high boost conditions. The choice of which correlation to use would be based on the current boost pressure P.

Although dependent on the engine used for the disclosed method, typically, i would typically range between 2 and 20 cycles. An i of between 5 and 15 is preferred for a typical engine, by way of example, and i=10 provides satisfactory results. Averaging the parameters used to calculate the SOC in this way improves the accuracy in estimating the SOC.

Also, i of 1 might be appropriate where considering controls like misfire and excessive rapid heat release.

Note that further filtering of the SOC determined from the averaged parameters may be needed. The filtering may be needed to ensure that the closed-loop control system does not overreact to inherent cycle-to-cycle variations in SOC. However, preferably care should be taken to ensure that the filtering is not too heavy to avoid a delay between the combustion event and measurement that is unacceptably long. For example, relative short delay times are needed if the engine transient behavior is of concern or if the potential exists to cause damage to the engine if SOC is too advanced for an extended period of time (greater than a few seconds). Much over 20 engine cycles would typically be too long, where twenty engine cycles corresponds to 1.33 seconds at 1800 rpm.

As well, the $x_i(\theta_p)$, $\theta_{i,p}$ and $P_i$ can be gathered from consecutive cycles of the engine or not.

To complete the process at step 220, consideration is given as to whether the engine is being commanded to run or not. The cycle repeats itself from step 202 if the engine is still running otherwise it stops, step 222.

As noted above in regards to FIG. 1, once SOC is estimated from equation 13 above, it is used to adjust future actual SOC. Control over SOC is realized by adjusting SOC levers as would be understood by a person skilled in the art. SOC levers known in the art include pilot fuel quantity, duration and timing, intake manifold temperature and pressure, internal or external EGR levels or concentrations, fumigated air-fuel equivalence ratio, effective compression or expansion ratios, spark plug timing and glow plug temperature.

Figure 5:
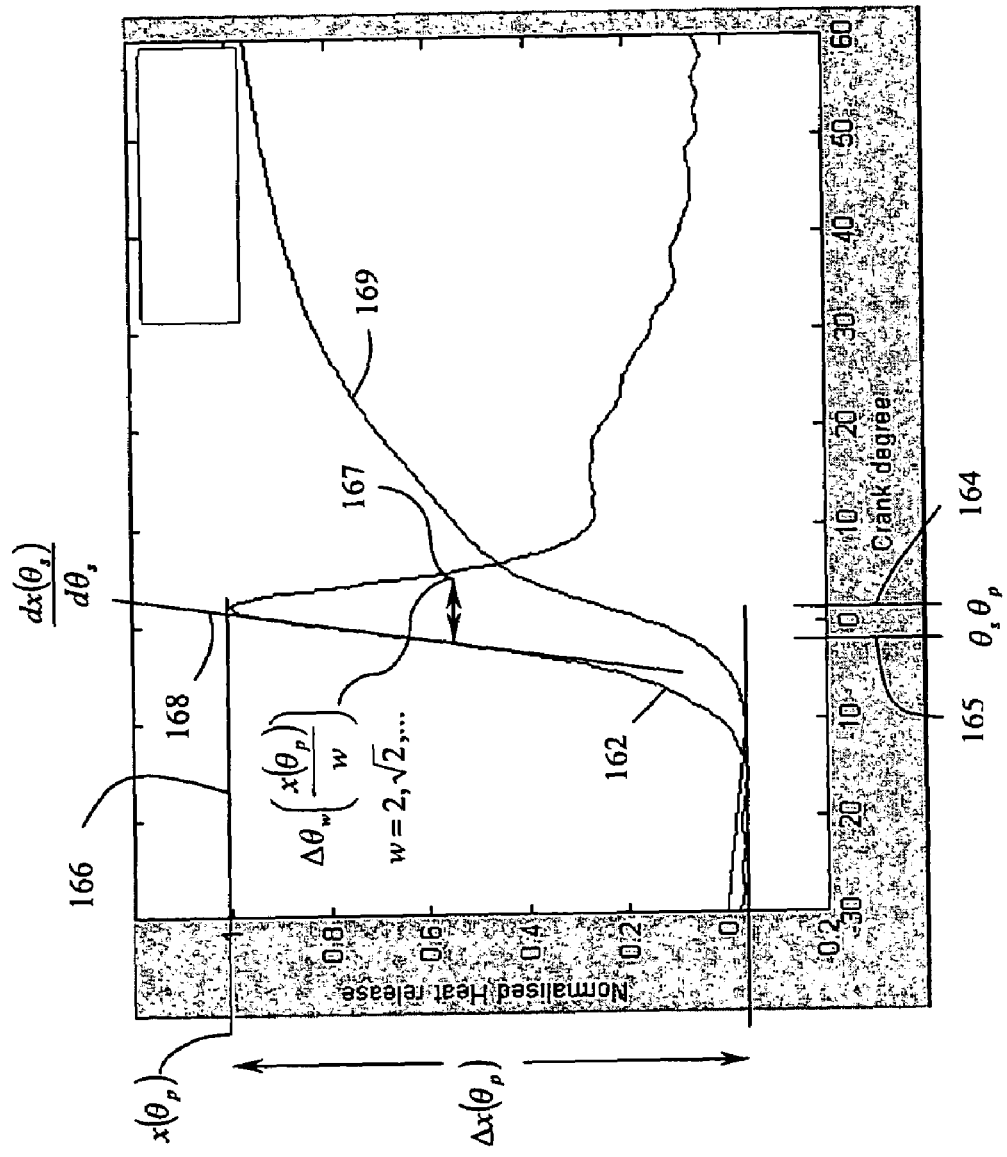
FIG. 5 shows a graph of heat release plotted against crank angle, indicating the variables used to estimate SOC.

Referring to FIG. 5, a heat release trace 162 is shown where the trace magnitude and position are set. That is, $x(\theta_{i,p}) \Rightarrow x(\theta_p)$ and $\theta_{i,p} \Rightarrow \theta_p$. The peak magnitude or value, $x(\theta_p)$, 166, and associated position in crank angle degrees of the peak value, $\theta_p$, 164 are highlighted in the figure. This figure also demonstrates that other properties of the resulting $x_{cf}(\theta)$ curve can be used to estimate an SOC. In general, while equation $f(x_{cf}(\theta_p), \theta_p, P)$ is a preferred relationship as provided for in equation 13, SOC could be estimated by reference to such selected properties of the processed data set, $x_{cf}(\theta)$, as well as a peak value, $x(\theta_p)$ and a peak value crank angle, $\theta_p$, but also a crank angle curve width 167 at a pre-determined fraction of said peak value, $\Delta\theta_w(x(\theta_p)/w)$ where w=2, $\sqrt{2}$, . . . , a slope 168 of said processed data set at a rising crank angle found prior to said peak value, $\theta_s$, namely, $dx(\theta_s)/d\theta_s$, peak height, $\Delta x(\theta_p)$, the total heat release or integrated data set, $$\int_{\theta_1}^{\theta_2} x_{cf}(\theta) d(\theta).$$

As with equation 13, these relationships could include engine operating conditions such as boost pressure, engine speed, intake charge or intake air flow, as well as others. Parameters taken directly from the band-pass filtered accelerometer data can be used in determining SOC. For example, the energy of the accelerometer signal within a certain frequency range might correlate well with SOC. That is, parameters from the reconstructed heat release trace can be used in conjunction with parameters determined from the raw accelerometer data to estimate the SOC.

Most engines would benefit from the above techniques, especially where the combustion controls or levers include a lag between adjustment of such levers and combustion phasing (start of combustion). As well, diesel engines, spark engines, gaseous-fuelled engines, two and four stroke engines, rotary engines would benefit from the teachings of this disclosure. Note that faster engines would generally require correspondingly faster processing capabilities within the controller used to provide the processed data set.

Further, as would be understood by a person skilled in the art, the accelerometer data set, $y(\theta)$, can be averaged first for the iterations i collected or processed (cepstrally filtered and transformed to provide the heat release data set) and then averaged.

Also, while this technique is preferably used for accelerometer generated data, as accelerometers are robust and relatively inexpensive, the technique is valuable for generating a heat release data set for an internal combustion chamber for other signals that contain heat release or combustion quality data. For example, optical sensors or strain gauge sensor data sets can be used to extract heat release trace information.

Placement of the accelerometer in the engine can be anywhere that provides a signal that is indicative of combustion conditions within the combustion chamber. The head bolt, main bearing cap and main bearing cap bolt are all appropriate position for the accelerometer. The main bearing cap is preferred of the three example locations mentioned.

The accelerometer chosen should be able to reliably measure the mechanical vibrations induced by the combustion process. Therefore, an accelerometer preferably should be able to detect a frequency range of vibrations from 0.5 kHz through to approximately 5 kHz in many engine however, this is dependent on the engine used. Preferably, the accelerometer should be able to measure between ±100 g for many engines, however, this too is dependent on the engine considered. The following provides a preferred range of accelerometer specification for the method disclosed:

| Frequency range [kHz] | Measuring range g-force | Sensitivity [mV/g] | Linearity [%] | Capacitance [pF] | Self-impedance [MΩ] |
| --- | --- | --- | --- | --- | --- |
| 0–5 kHz | 0–100 | ≈25 | 0% | 900 | 5 |

Processing of the accelerometer data is processor intensive. The following processor features should be sufficient for the method considered above:

150 Mhz clock, (6.67 ns cycle time)
High-performance 32 bit CPU
Fast Interrupt Response and Processing
12 bit ADC, 16 channels
CAN interface
On chip Memory
128K×16 Flash
18K×16 RAM4K×16 ROM
Up to 1M external Memory
where the sampling frequency is 20 kHz.

Calibration for the method discussed could vary from engine to engine. However, typical calibration techniques know to a person skilled in the art would be appropriate developing the actual SOC controls taught above.

While particular elements, embodiments and applications of the present disclosure have been shown and described, it will be understood, of course, that the disclosure is not limited thereto since modifications may be made by those skilled in the art without departing from the scope of the present disclosure, particularly in light of the foregoing teachings.

The invention claimed is:

1. A method of controlling combustion of a fuel within a combustion chamber of internal combustion engine, said method comprising,
 a. during a cycle of said engine:
  i. introducing a charge into said combustion chamber,
  ii. compressing said charge within said combustion chamber,
  iii. introducing said fuel into said combustion chamber,
  iv. burning said fuel within said combustion chamber to drive a piston disposed within said combustion chamber,
 b. delivering an accelerometer data set to a controller, said accelerometer data set collected during at least two cycles of said engine,
 c. processing said accelerometer data set to generate a processed data set indicative of a heat release rate over said at least two cycles,
 d. estimating from said processed data set, an SOC error using a pre-determined target start of combustion for said fuel,
 e. if the magnitude of said SOC error is greater than 0, adjusting a start of combustion lever for at least one subsequent cycle of said engine to drive a corrected start of combustion during said at least one subsequent cycle towards said pre-determined target start of combustion.

2. The method of claim 1 wherein said lever is at least one of:
 a. glow plug temperature,
 b. spark plug timing,
 c. pilot fuel quantity,
 d. pilot fuel injection timing,
 e. intake manifold temperature,
 f. intake manifold pressure,
 g. exhaust gas intake charge concentration,
 h. pilot fuel injection duration, and
 i. equivalence ratio of said fuel.

3. The method of claim 1 wherein said SOC error is determined from a comparison of an estimated start of combustion of said fuel determined from said processed data set and said pre-determined target start of combustion.

4. The method of claim 1 wherein said controller adjusts said start of combustion lever.

5. The method of claim 1 wherein a second controller adjusts said start of combustion lever.

6. The method of claim 1 wherein said accelerometer data set is collected from at least 10 consecutive cycles of said engine.

7. The method of claim 1 wherein said accelerometer data set is collected from between 5 and 15 consecutive cycles of said engine.

8. The method of claim 1 wherein said pre-determined start of combustion is based on at least one of engine speed and boost pressure.

9. The method of claim 1 wherein a cepstral filter is applied to said accelerometer data set to provide said processed data set.

10. The method of claim 3 wherein said estimated start of combustion is determined using a peak value of said processed data, a crank angle associated with said peak value of said processed data and a boost pressure associated with said charge over said at least two cycles.

11. The method of claim 10 wherein said estimated start of combustion is determined using the following relationship:

$$SOC = a_1 + (a_2 + a_3 x(\theta_p)) \times x(\theta_p) + (a_4 + a_5 \theta_p) \times \theta_p + (a_6 + (a_7 + a_8 x(\theta_p)) \times x(\theta_p) + (a_9 + a_{10} \theta_p) \times \theta_p) \times P$$

where $a_1, \ldots, a_{10}$ are constants from said processed data set, $x(\theta_p)$ is said peak value, $\theta_p$ is said peak value crank angle, and P is said boost pressure.

12. The method of claim 3 wherein said estimated start of combustion is determined using a slope value of said processed data determined from an associated crank angle for said slope value earlier than a peak crank angle.

13. The method of claim 1 further comprising selecting from said accelerometer data set a knock measurement, said knock measurement used to control rate of combustion in said subsequent cycle of said engine.

14. The method of claim 1 further comprising selecting from said accelerometer data set a misfire measurement, said misfire measurement used to control combustion in said subsequent cycle of said engine.

15. A method of determining combustion quality within a combustion chamber of an operating internal combustion engine, said method comprising:
 a. during a cycles of said engine, generating an accelerometer data set from accelerometer measurements provided by an accelerometer positioned on said engine capable of measuring data indicative of combustion behavior within said combustion chamber;
 b. processing said accelerometer data set to reconstruct a processed data set indicative of heat release rate within said combustion chamber during said cycle of said engine;
 c. comparing properties of said processed data set with properties of a predetermined desired data set to provide an indication of said combustion quality.

16. The method of claim 15 further comprising calculating a transfer function appropriate for reconstructing said processed data set from said accelerometer data set.

17. The method of claim 15 wherein a cepstral filter is applied to said accelerometer data set data set to generate said processed data set.

18. The method of claim 15 wherein a peak value from said processed data is compared to a peak value from said predetermined desired data set to provide said indication of said combustion quality.

19. A method of estimating start of combustion within a combustion chamber of an internal combustion engine,
 a. during a cycle of said engine:
  i. introducing a charge into said combustion chamber,
  ii. compressing said charge within said combustion chamber,
  iii. introducing a fuel into said combustion chamber,
  iv. burning said fuel within said combustion chamber to drive a piston disposed within said combustion chamber,
  v. determining a data set indicative of a physical condition within said combustion chamber during said cycle, b. accumulating at least two data sets from corresponding cycles of said engine;
c. processing said at least two data sets to generate processed data sets indicative of a heat release rate over said corresponding cycles of said engine, wherein a cepstral filter is applied to said at least two data sets to generate said processed data sets,
d. estimating said start of combustion for said corresponding cycles of said engine from a predetermined relationship that is a function of selected properties of said processed data sets.

20. The method of claim 19 wherein between 5 and 15 data sets are used to generate said processed data sets.

21. The method of claim 19 wherein fewer than 20 data sets are used to generate said processed data sets.

22. The method of claim 19 wherein said at least two data sets are accumulated from consecutive cycles of said engine.

23. The method of claim 19 wherein said data set is collected from at least one of an accelerometer, an optical sensor, a strain gauge and a pressure sensor.

24. The method of claim 19 wherein an averaging filter is applied to said at least two data sets prior to applying said cepstral filter.

25. The method of claim 19 wherein said selected properties comprise at least one of a peak value, a peak value crank angle, a crank angle curve width at a pre-determined fraction of said peak value, a slope of said processed data at a rising crank angle found prior to said peak value, and a ratio of said peak value and said width.

26. The method of claim 25 wherein said predetermined relationship is:

$$SOC = a_1 + (a_2 + a_3 x(\theta_p)) \times x(\theta_p) + (a_4 + a_5 \theta_p) \times \theta_p + (a_6 + (a_7 + a_8 x(\theta_p)) \times x(\theta_p) + (a_9 + a_{10} \theta_p) \times \theta_p) \times P$$

where $a_1, \ldots, a_{10}$ are constants from said processed data set, $x(\theta_p)$ is said peak value, $\theta_p$, is said peak value crank angle, and P is a boost pressure associated with said charge over said corresponding cycles.

* * * * *

UNITED STATES PATENT AND TRADEMARK OFFICE
CERTIFICATE OF CORRECTION

PATENT NO. : 7,133,761 B2
APPLICATION NO. : 10/822333
DATED : November 7, 2006
INVENTOR(S) : Richard Ancimer It is certified that error appears in the above-identified patent and that said Letters Patent is hereby corrected as shown below:

In the drawings, Sheet 2, FIG. 2, the formula at step 154 should be replaced with the formula listed below:

$$H(f) = \frac{G_{xx}(f)}{G_{xy}(f)}$$

Signed and Sealed this

Third Day of June, 2008

JON W. DUDAS
*Director of the United States Patent and Trademark Office*